(12) United States Patent
Fringant et al.

(10) Patent No.: US 8,609,771 B2
(45) Date of Patent: Dec. 17, 2013

(54) PROCESS FOR PREPARING A VINYLIDENE CHLORIDE POLYMER COMPOSITION

(75) Inventors: Christophe Fringant, Tavaux (FR); Pascal Dewael, Buvrinnes (BE); Yves Vanderveken, Heverlee (BE)

(73) Assignee: Solvay (Societe Anonyme), Brussels (BE)

(*) Notice: Subject to any disclaimer, the term of this patent is extended or adjusted under 35 U.S.C. 154(b) by 688 days.

(21) Appl. No.: 12/438,769

(22) PCT Filed: Sep. 4, 2007

(86) PCT No.: PCT/EP2007/059257
§ 371 (c)(1),
(2), (4) Date: Feb. 25, 2009

(87) PCT Pub. No.: WO2008/028918
PCT Pub. Date: Mar. 13, 2008

(65) Prior Publication Data
US 2009/0202760 A1    Aug. 13, 2009

(30) Foreign Application Priority Data

Sep. 5, 2006 (FR) ..................... 06 07797

(51) Int. Cl.
*C08F 283/02*    (2006.01)
(52) U.S. Cl.
USPC ........... 525/186; 524/502; 525/190; 525/412; 525/413; 525/415
(58) Field of Classification Search
USPC .......... 524/412, 413, 415, 502; 525/412, 413, 525/415, 186
See application file for complete search history.

(56) References Cited

U.S. PATENT DOCUMENTS

| | | | |
|---|---|---|---|
| 3,274,143 A | | 9/1966 | Hostettler et al. |
| 3,760,034 A | * | 9/1973 | Critchfield et al. ........... 525/412 |
| 3,762,979 A | | 10/1973 | Hanel et al. |
| 3,800,006 A | | 3/1974 | Katayama et al. |
| 3,884,994 A | * | 5/1975 | Critchfield et al. ............. 525/63 |
| 3,904,579 A | * | 9/1975 | Braddicks ..................... 524/351 |
| 4,511,687 A | * | 4/1985 | Nakanishi et al. ............ 524/270 |
| 4,791,189 A | | 12/1988 | Yu |
| 4,826,934 A | | 5/1989 | Malfroid et al. |
| 4,889,892 A | | 12/1989 | Malfroid et al. |
| 5,314,970 A | * | 5/1994 | MacLeay et al. ............. 525/450 |
| 5,382,636 A | * | 1/1995 | Schmidt et al. ............... 525/412 |
| 5,969,031 A | | 10/1999 | Ruckenstein et al. |
| 2010/0135601 A1 | | 6/2010 | Dewael et al. |

FOREIGN PATENT DOCUMENTS

| | | |
|---|---|---|
| EP | 0264982 A1 | 4/1988 |
| EP | 0281649 A1 | 9/1988 |
| EP | 0301632 A1 | 2/1989 |
| FR | 2872166 A1 | 12/2005 |
| GB | 914252 | 1/1963 |
| GB | 1518324 | 7/1978 |
| GB | 2344595 A | 6/2000 |
| JP | 5916149 A * | 9/1984 |
| SU | 1781231 A1 * | 12/1992 |
| WO | WO 0036009 A1 | 6/2000 |
| WO | WO 2008/028915 A1 | 3/2008 |

OTHER PUBLICATIONS

Derwent Abstract of SU 1781231 A1, 1994.*
Derwent Abstract of JP 5916149 A, 1988.*
Deanin, R. et al. "Synthetic Resins and Plastics", Kent and Riegel's Handbook of Industrial Chemistry and Biotechnology, 2007, Springer-Verlag, vols. 1 & 2, pp. 623-651.*
Bushow et al. Encyclopedia of Materials-Science and Technology, 2001, Elsevier, vols. 1-11, pp. 551-555.*
E.M. Woo, J.W. Barlow, D.R. Paul, "Miscible blends of a vinylidene chloride-vinyl chloride copolymer with aliphatic polyesters"—Journal of Applied Polymer Science—1983, vol. 28 (4) pp. 1347-1360.
A. Garton, "FTIR of polycaprolactone-PVDC-co-acrylonitryle miscible blends"—Journal of Polymer Science, Polymer Letters Edition—1983, vol. 21 (1) pp. 45-47.
M. Aubin, Y. Bedard, MF. Morrissette, R.E. Prud'Homme, "Miscible blends prepared from two crystalline polymers"—Journal of Polymer Science, Polymer Physics Edition—1983, vol. 21 (2) pp. 233-240.
E.M.Woo, J.W.Barlow, D.R.Paul, "Phase behavior of blends of aliphatic polyesters with a VDC-VC copolymer"—Journal of Applied Polymer Science—1986, vol. 32 (3) pp. 3889-3897.
H. Zhang & RE. Prud'Homme, "Determination of the thermodynamic polymer-polymer interaction parameter of miscible blends prepared from two crystalline polymers"—Journal of Polymer Science, Polymer Physics Edition—1987, vol. 25 (4) pp. 723-738.
H. Li & E. Ruckenstein, "Mutual toughening of VDC and MMA in network composites prepared via concentrated emulsion polymerization"—Polymer—1996, vol. 37 (10) pp. 1933-1940.
G.C. Eastmond, "Blends of vinylidene chloride copolymers (SARAN)"—Advances in Polymer Science—2000, V 149, Ch. 10, pp. 113-115.
PCT International Search Report dated Nov. 8, 2007 for International Application No. PCT/EP2007/059257 (2 p.).
Search Report dated Apr. 23, 2007 from Institut National De La Propriete Industrielle for French Application No. FR06.07797 (2 p.).
U.S. Appl. No. 12/438,770, filed Mar. 12, 2009, Pascal Dewael et al.

* cited by examiner

*Primary Examiner* — Nicole M Buie-Hatcher
(74) *Attorney, Agent, or Firm* — Oblon, Spivak, McClelland, Maier & Neustadt, L.L.P.

(57) ABSTRACT

Process for preparing a composition of a vinylidene chloride polymer and at least one ε-caprolactone polymer according to which:
a) during the preparation of the vinylidene chloride polymer by polymerization of the vinylidene chloride and at least one comonomer that is copolymerizable with it, at least one ε-caprolactone polymer, preformed in a medium other than that of the vinylidene chloride polymerization, is added; and
b) optionally, in addition, at least one ε-caprolactone polymer is added to the vinylidene chloride polymer isolated at the end of step a).

Process for preparing articles, in particular films, which includes the use of a composition prepared by the aforementioned process. Single-layer or multilayer film comprising said composition and packaging or bag formed from this film.

15 Claims, No Drawings

PROCESS FOR PREPARING A VINYLIDENE CHLORIDE POLYMER COMPOSITION

CROSS-REFERENCE TO RELATED APPLICATIONS

This application is a U.S. national stage application under 35 U.S.C. §371 of International Application No. PCT/EP2007/059257 filed Sep. 4, 2007, which claims priority to French Application No. FR06.07797 filed Sep. 5, 2006, these applications being herein incorporated by reference in their entirety for all purposes.

The present invention relates to a process for preparing a composition of a vinylidene chloride polymer and at least one ε-caprolactone polymer, a process for preparing articles, in particular films, which includes the use of such a composition, and also the film comprising such a composition and the packaging or bag formed from this film.

Vinylidene chloride polymers are known for their remarkable properties as regards permeability to gases and odours. They are thus frequently used for producing articles, in particular films, used for food and medical packaging.

One disadvantage of vinylidene chloride polymers is that they have a tendency to decompose under the action of heat. It is therefore necessary to consider their thermal stability in order to avoid this drawback. Their processing is furthermore facilitated if their lubrication is improved by the addition of a suitable additive. In so far as certain additives can have an effect on the barrier properties of these polymers, it is nevertheless important to make sure that, after additivation, they have the characteristics required in terms of permeability to gases and odours, in particular to oxygen and to carbon dioxide.

It is also important to make sure that the additives used do not migrate through the polymer matrix or, in the case of multilayer films of which one layer is produced using such a polymer, between the layers of said films. In the latter case, these compounds could then disadvantageous reach the surface of the film and thus be in contact with the food or medication packaged with this film. Such a situation is not only undesirable from a sanitary viewpoint but is also in contra-indication to most of the regulations in the food and medical packaging field. The foregoing therefore reveals the difficulty which may be presented by the selection of additives to be incorporated into the vinylidene chloride polymers.

Among these, ε-caprolactone polymers are known to have a plasticizing effect on vinylidene chloride polymers. U.S. Pat. No. 3,762,979 thus discloses compositions of a vinylidene chloride polymer containing from 2 to 6% by weight, relative to the weight of the vinylidene chloride polymer, of an ε-caprolactone polymer characterized by a molecular weight varying from 11 400 to 114 000 g/mol, therefore solid at room temperature. Said compositions are prepared by simple mixing of the two polymers in the powdery or pulverulent state; a process which disadvantageously results in compositions that generally lack homogeneity and therefore suffer from a certain lack of reproducibility of their properties. The foregoing therefore reveals the difficulties which may be encountered during preparation of compositions of a vinylidene chloride polymer and at least one ε-caprolactone polymer.

To avoid the disadvantages linked to the preparation of these compositions by mixing in the powdery or pulverulent state, an alternative could be arranged so that the additive that it is desired to add to the polymer is incorporated during the preparation of the polymer as mentioned, but not illustrated, by Patent Application EP-A-301 632 for producing flexible compositions of a copolymer of vinyl chloride and a particular alkyl acrylate and an ε-caprolactone polymer, having applications in the medical and automotive fields and in the building industry.

It is nevertheless well known to experts in the polymerization of vinylidene chloride that adding a third substance during the polymerization of this monomer may not only affect the good operation of this but, in addition, have damaging consequences on the remarkable gas and odour permeability properties, characteristic of vinylidene chloride polymers and not exhibited by vinyl chloride polymers. Thus, it has already been observed that incorporating a compound from the family of IRGANOX® compounds has the effect of inhibiting the polymerization of vinylidene chloride.

Patent Application EP-A-264 982 has itself proposed a process that consists in preparing vinyl halide polymers, including vinylidene chloride polymers, which are modified by a polymer of an oxygenated heterocyclic compound, in a first step which consists in polymerizing the oxygenated heterocyclic monomer by an ionic route in the presence of the vinyl halide monomer (especially vinylidene chloride), optionally with the addition of one or more comonomer(s), and in a second step, without having isolated the polymer of the oxygenated heterocyclic compound obtained at the end of the first step, which consists in polymerizing, by a radical route in aqueous dispersion and in the presence of the polymerization medium from the first step, said vinyl halide, optionally with the addition of its comonomers, already present during the first step.

Although this process makes it possible to avoid the disadvantages presented by the aforementioned mixing process, it nevertheless remains a process which is complex to implement and which is characterized by a low productivity in so far as it involves a relatively long polymerization time and consequently it is not very advantageous economically and therefore not viable on an industrial scale.

Therefore, there remains a need to find a process for preparing a composition of a vinylidene chloride polymer and at least one ε-caprolactone polymer which does not have the disadvantages presented by the processes of the prior art and which moreover make it possible to obtain compositions of a vinylidene chloride polymer that are characterized by the required properties in terms of thermal stability and that results in the production of films that are characterized by the required properties in terms of oxygen and carbon dioxide barrier, in particular which are characterized by a good compromise between the carbon dioxide barrier and that of oxygen, and by a better stability of the oxygen barrier over time.

For this purpose, the invention relates to a process for preparing a composition of a vinylidene chloride polymer and at least one ε-caprolactone polymer according to which:

a) during the preparation of the vinylidene chloride polymer by polymerization of vinylidene chloride and at least one comonomer that is copolymerizable with it, at least one ε-caprolactone polymer, preformed in a medium other than that of the vinylidene chloride polymerization, is added; and b) optionally, in addition, at least one ε-caprolactone polymer is added to the vinylidene chloride polymer recovered at the end of step a).

The expression "vinylidene chloride polymer" is understood to mean vinylidene chloride homopolymers and also copolymers. The vinylidene chloride polymer according to the invention is advantageously a vinylidene chloride copolymer.

The expression "vinylidene chloride copolymer" is understood to mean copolymers of vinylidene chloride, which is the main monomer, with at least one comonomer with which it is copolymerizable.

Among the comonomers that are copolymerizable with vinylidene chloride, mention may be made, non-limitingly, of vinyl chloride, vinyl esters such as for example vinyl acetate, vinyl ethers, acrylic acids, esters and amides, methacrylic acids, esters and amides, acrylonitrile, methacrylonitrile, styrene, styrene derivatives, butadiene, olefins such as for example ethylene and propylene, itaconic acid and maleic anhydride, but also copolymerizable surfactants such as 2-acrylamido-2-methylpropanesulphonic acid (AMPS) or one of its salts, for example the sodium salt, 2-sulphoethyl-methacrylic acid (2-SEM) or one of its salts, for example the sodium salt, and the phosphate ester of methacrylate-terminated polypropylene glycol (such as the product SIPOMER PAM-200 from Rhodia) or one of its salts, for example the sodium salt.

The vinylidene chloride polymer according to the invention is preferably a copolymer composed of vinylidene chloride in an amount of at least 50 wt % and at least one comonomer chosen from vinyl chloride and/or at least one monomer chosen from maleic anhydride, itaconic acid and (meth) acrylic monomers corresponding to the general formula:

$$CH_2=CR_1R_2$$

in which $R_1$ is chosen from hydrogen and the methyl radical and $R_2$ is chosen from the —CN radical and the —CO—$R_3$ radical in which $R_3$ is chosen from the —OH radical, the —O—$R_4$ radicals with $R_4$ chosen from linear or branched alkyl radicals containing from 1 to 18 carbon atoms optionally bearing one or more —OH radicals, epoxyalkyl radicals containing from 2 to 10 carbon atoms and alkoxyalkyl radicals containing a total of 2 to 10 carbon atoms and finally $R_4$ is also chosen from the —$NR_5R_6$ radicals in which $R_5$ and $R_6$, which are the same or different, are chosen from hydrogen and the alkyl radicals containing from 1 to 10 carbon atoms, optionally bearing one or more —OH radicals, the aforementioned copolymerizable surfactants and the phosphate ester of methacrylate-terminated polypropylene glycol or one of its salts, for example the sodium salt.

The vinylidene chloride polymer according to the invention is particularly preferably a copolymer composed of vinylidene chloride in an amount of at least 50 wt % and at least one comonomer chosen from vinyl chloride and/or at least one monomer chosen from (meth)acrylic monomers corresponding to the general formula:

$$CH_2=CR_1R_2$$

in which $R_1$ is chosen from hydrogen and the methyl radical and $R_2$ is the —CO—$R_3$ radical in which $R_3$ is chosen from the —OH radical, the —O—$R_4$ radicals with $R_4$ chosen from linear or branched alkyl radicals containing from 1 to 18 carbon atoms optionally bearing one or more —OH radicals, epoxyalkyl radicals containing from 2 to 10 carbon atoms and alkoxyalkyl radicals containing a total of 2 to 10 carbon atoms.

The vinylidene chloride polymer according to the invention is more particularly preferably a copolymer composed of vinylidene chloride in an amount of at least 50 wt % and at least one comonomer chosen from (meth)acrylic monomers corresponding to the general formula:

$$CH_2=CR_1R_2$$

in which $R_1$ is chosen from hydrogen and the methyl radical and $R_2$ is the —CO—$R_3$ radical in which $R_3$ is chosen from the —OH radical and —O—$R_4$ radicals with $R_4$ chosen from linear or branched alkyl radicals containing from 1 to 18 carbon atoms optionally bearing one or more —OH radicals, epoxyalkyl radicals containing from 2 to 10 carbon atoms and alkoxyalkyl radicals containing a total of 2 to 10 carbon atoms.

Among the comonomers corresponding to the general formula:

$$CH_2=CR_1R_2$$

mention may be made of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylic acid and methacrylic acid.

The vinylidene chloride polymer according to the invention is most particularly preferably a copolymer composed of vinylidene chloride in an amount of at least 50 wt % and at least one comonomer chosen from methyl acrylate, methyl methacrylate, ethyl acrylate, ethyl methacrylate, n-butyl acrylate, n-butyl methacrylate, 2-ethylhexyl acrylate and 2-ethylhexyl methacrylate.

One vinylidene chloride polymer according to the invention that gives very good results is a copolymer composed of vinylidene chloride in an amount of at least 50 wt % and methyl acrylate.

Advantageously, the amount of vinylidene chloride in the vinylidene chloride copolymers varies from 50 to 95 wt %, preferably from 60 to 95 wt %, particularly preferably from 70 to 95 wt % and more particularly preferably from 80 to 95 wt %.

Advantageously, the amount of vinyl chloride in the vinylidene chloride copolymers varies from 0.5 to 50 wt %, preferably from 5 to 40 wt %, particularly preferably from 5 to 30 wt % and more particularly preferably from 5 to 20 wt %.

Advantageously, the amount of methyl acrylate in the vinylidene chloride copolymers varies from 5 to 50 wt %, preferably from 5 to 40 wt %, particularly preferably from 5 to 30 wt % and more particularly preferably from 5 to 20 wt %.

The expression "ε-caprolactone polymer" is understood to denote both the homopolymers of ε-caprolactone (or 2-oxepanone) and the copolymers of it with at least one other comonomer.

The ε-caprolactone polymers may have a different structure from one another. Thus, they may have a linear or branched structure considering, for example, their method of preparation, in particular the polymerization initiator used. When they have a branched structure, they may especially be in the form of a structure having 3 or even 4 branches. Their chain ends may be hydroxyl groups or else carboxylic groups.

Depending on their molecular weight, the ε-caprolactone polymers may be in the form of a solid (powder or granules), in the form of a viscous product (paste, wax, etc.) or in the form of a liquid at room temperature.

Generally, the ε-caprolactone polymers whose molecular weight is greater than 10 000 g/mol are in solid form at room temperature whereas those whose molecular weight is less than or equal to 10 000 g/mol are instead in the form of a viscous product or a liquid.

The expression "molecular weight" is understood to mean the number-average molecular weight.

The ε-caprolactone polymers whose molecular weight is greater than 10 000 g/mol are preferably characterized by a molecular weight greater than or equal to 15 000 g/mol, particularly preferably greater than or equal to 20 000 g/mol. These same polymers are preferably characterized by a molecular weight less than or equal to 100 000 g/mol, particularly preferably less than or equal to 80 000 g/mol.

The ε-caprolactone polymers whose molecular weight is less than or equal to 10 000 g/mol are preferably characterized by a molecular weight less than or equal to 9000 g/mol, particularly preferably less than or equal to 8500 g/mol and more particularly preferably less than or equal to 8000 g/mol. These same polymers are preferably characterized by a molecular weight greater than or equal to 150 g/mol, particularly preferably greater than or equal to 200 g/mol.

The ε-caprolactone polymers whose molecular weight is less than or equal to 10 000 g/mol are preferably characterized by a viscosity less than or equal to 9500, particularly preferably less than or equal to 8000, more particularly preferably less than or equal to 7000 and most particularly preferably less than or equal to 5000 mPa·s at 60° C.

Some ε-caprolactone polymers that are particularly well suited for preparing the compositions according to the invention are the ε-caprolactone polymers sold by Solvay Interox Limited under the trademark CAPA®.

According to step a) of the process according to the invention, during the preparation of the vinylidene chloride polymer by polymerization of the vinylidene chloride and at least one comonomer that is copolymerizable with it, at least one ε-caprolactone polymer, preformed in a medium other than that of the vinylidene chloride polymerization, is added.

The expression "at least one ε-caprolactone polymer" is understood to mean that one or more ε-caprolactone polymers are added.

The expression "preformed in a medium other than that of the vinylidene chloride polymerization" is understood to mean that the ε-caprolactone polymer is not prepared in the vinylidene chloride polymerization medium, but that it was prepared prior to and independently of the vinylidene chloride polymer, in another polymerization medium from which it was isolated before being added into the medium in which the vinylidene chloride is then polymerized. The ε-caprolactone polymer is therefore advantageously a polymer prepared before it is added to the vinylidene chloride polymerization medium.

Any route for the polymerization of vinylidene chloride and at least one comonomer that is copolymerizable with it may be used. Preferably, the polymerization according to step a) is carried out by a radical route in aqueous dispersion.

The expression "polymerization in aqueous dispersion" is understood to mean the polymerization processes taking place in water in the presence of at least one surfactant.

The expression "at least one surfactant" is understood to mean that the polymerization process may take place in the presence of one or more surfactants.

The term "surfactant" is understood to mean any compound having in its structure one or some hydrophilic parts and one or some hydrophobic parts. This hydrophilic/hydrophobic balance allows the surfactant to have an interfacial activity that makes it possible to provide dispersion and stabilization of the organic phase in the aqueous phase.

Among the surfactants, mention may be made of dispersants, also called protective colloids or suspension agents (hereinafter called dispersants), but also emulsifiers.

The expression "aqueous dispersion polymerization" is understood to mean radical polymerization in aqueous suspension, radical polymerization in aqueous microsuspension, radical polymerization in aqueous emulsion and radical polymerization in aqueous miniemulsion.

The expression "radical polymerization in aqueous suspension" is understood to mean any radical polymerization process performed in aqueous medium in the presence of dispersants as surfactants and oil-soluble radical generators.

The expression "polymerization in aqueous microsuspension", also called polymerization in homogenized aqueous dispersion, is understood to mean any radical polymerization process in which oil-soluble radical generators are used and an emulsion of monomer droplets is prepared by virtue of a powerful mechanical stirring and which is characterized by the presence of emulsifiers as surfactants.

The expression "radical polymerization in aqueous emulsion" is understood to mean any radical polymerization process performed in aqueous medium in the presence of emulsifiers as surfactants and oil-soluble radical generators. Polymerization in aqueous emulsion is sometimes also called polymerization in ab initio emulsion.

The expression "polymerization in aqueous miniemulsion" is understood to mean any radical polymerization process in which oil-soluble radical generators and/or water-soluble radical generators and also a hydrophobic agent are used and an emulsion of monomer droplets is prepared by virtue of a powerful mechanical stirring and which is characterized by the presence of emulsifiers and optionally dispersants as surfactants.

The polymerization according to step a) is particularly preferably carried out by a radical route in aqueous suspension.

As examples of dispersants, mention may be made of partially hydrolysed polyvinyl acetates, gelatin, starch, polyvinylpyrrolidinone, vinyl acetate/maleic anhydride copolymers, water-soluble derivatives of cellulose ethers such as methyl cellulose, ethyl cellulose, carboxymethyl cellulose, methyl hydroxypropyl cellulose, hydroxyethyl cellulose and hydroxypropyl cellulose.

Preferably, the dispersants are water-soluble derivatives of cellulose ethers. Among those, methyl hydroxypropyl cellulose is particularly preferred.

As examples of radical generators, mention may be made of diazo compounds, peroxides and dialkyldiphenylalkanes.

Diazo compounds and peroxides are preferred.

The expression "oil-soluble radical generators" is understood to mean the radical generators soluble in the monomer or monomers.

As examples of oil-soluble diazo compounds, mention may be made of:
2,2'-azobis(4-methoxy-2,4-dimethylvaleronitrile);
2,2'-azobis(2,4-dimethylvaleronitrile);
(1-phenylethyl)azodiphenylmethane;
2,2'-azobisisobutyronitrile;
dimethyl-2,2'-azobisisobutyrate;
1,1'-azobis(1-cyclohexanecarbonitrile);
2,2'-azobis(2-methylbutyronitrile);
2,2'-azobis(2,4,4-trimethylpentane);
2-phenylazo-2,4-dimethyl-4-methoxyvaleronitrile; and
2,2'-azobis(2-methylpropane).

As examples of oil-soluble peroxides, mention may be made of:
diacyl peroxides such as dilauroyl peroxide, dibenzoyl peroxide and didecanoyl peroxide;
succinoyl peroxide;
organic hydroperoxides such as cumyl hydroperoxide and tert-amyl hydroperoxide;
dialkyl peroxydicarbonates such as diethyl peroxydicarbonate, diisopropyl peroxydicarbonate, dimyristyl peroxydicarbonate, dicyclohexyl peroxydicarbonate, di[2- ethylhexyl] peroxydicarbonate, di[4-tert-butyl] cyclohexyl peroxydicarbonate and dicetyl peroxydicarbonate; and peresters such as t-amyl perpivalate, t-butyl perpivalate, t-amyl peroxyneodecanoate, t-butyl peroxyneodecanoate and cumyl peroxyneodecanoate.

In the process according to the invention, the polymerization according to step a), besides the addition of at least one ε-caprolactone polymer, advantageously breaks down into the steps according to which:

a1) at least one fraction of the raw materials needed for the polymerization and also, optionally, at least one additive, are introduced into a reactor;

a2) the contents of the reactor are reacted while optionally introducing the balance of said raw materials, with optional addition of at least one additive, and, after reaction, a slurry containing residual monomers is obtained;

a3) the residual monomers are removed from the slurry obtained in step a2), with optional addition of at least one additive, and a slurry purified of the residual monomers is obtained; and a4) the vinylidene chloride polymer is isolated from the slurry obtained in step a3).

According to step a1) of the process according to the invention, at least one fraction of the raw materials needed for the polymerization and also, optionally, at least one additive, are introduced into a reactor.

The expression "raw materials" is understood to mean all the ingredients needed for the polymerization, especially water, the dispersant(s), the radical generator(s), the vinylidene chloride and the comonomer(s) that is/are copolymerizable with it.

The raw materials may be introduced in any order during step a1).

The term "additive" is understood to mean any compound, inert to the polymerization, which is intended to improve the properties of the vinylidene chloride polymer obtained.

The addition of at least one additive to step a1) is optional. Preferably, it is added thereto.

The expression "at least one fraction of the raw materials needed for the polymerization and also, optionally, at least one additive" is understood to mean that at least some of the raw materials and optionally at least one additive is added in step a1).

According to step a2) of the process according to the invention, the contents of the reactor are advantageously reacted while optionally introducing the balance of said raw materials, with optional addition of at least one additive, and, after reaction, a slurry containing residual monomers is obtained.

In order to make the contents of the reactor react according to step a2), means are advantageously used by which the radicals are generated within it. For this purpose, it is especially possible to heat the contents of the reactor or to expose it to an intense light radiation. Preferably, the contents of the reactor are heated.

The temperature at which the contents of the reactor are reacted is advantageously equal to at least 30° C. In addition, it is advantageously equal to at most 200° C., preferably at most 120° C. and particularly preferably at most 80° C.

Advantageously, step a2) is continued until the vinylidene chloride and the comonomer or comonomers with which it is copolymerizable have reacted to a certain extent. Step a2) is continued until the degree of conversion of the monomers is preferably at least 80%. Step a2) will be continued until the degree of conversion of the monomers is preferably at most 100%.

The balance of the raw materials needed for the polymerization is optionally introduced during step a2). Preferably, all the raw materials needed for the polymerization are introduced during step a1).

The addition of at least one additive to step a2) is optional. Preferably, it is not added thereto.

At the end of step a2), a slurry containing residual monomers is advantageously obtained.

The expression "residual monomers" is understood to mean the monomers which have not reacted and which are in the polymerization medium.

According to step a3) of the process according to the invention, the residual monomers are removed from the slurry obtained in step a2), with optional addition of at least one additive, and a slurry purified of the residual monomers is obtained.

Any means of removing the residual monomers from the slurry obtained in step a2) may be used. Preferably, the removal (known as stripping) of the residual monomers from the slurry obtained in step a2) is carried out by stripping under vacuum or else by stripping under vacuum and simultaneously injecting steam into the slurry. Advantageously, the abovementioned stripping is followed by a cooling phase.

The addition of at least one additive to step a3) is optional. If necessary, the additive or additives may be introduced at the beginning of the stripping phase, when this is underway, or after the stripping phase, in other words during the cooling phase, addition at the beginning being preferred. Preferably, the addition of at least one additive to step a3) does not take place.

At the end of step a3), a slurry purified of the residual monomers is advantageously obtained.

According to step a4) of the process according to the invention, the vinylidene chloride polymer is advantageously isolated from the slurry obtained in step a3).

Step a4) is preferably carried out by filtering the slurry obtained in step a3), followed by washing and drying of the cake obtained after filtering.

In the process according to the invention, the polymerization according to step a), besides the addition of at least one ε-caprolactone polymer, preferably breaks down into the steps according to which:

a1) all of the raw materials needed for the polymerization and also at least one additive are introduced into a reactor;

a2) the contents of the reactor are reacted and, after reaction, a slurry containing residual monomers is obtained;

a3) the residual monomers are removed from the slurry obtained in step a2) and a slurry purified of the residual monomers is obtained; and a4) the vinylidene chloride polymer is isolated from the slurry obtained in step a3).

According to step a), at least one ε-caprolactone polymer is added. At least one ε-caprolactone polymer may therefore be introduced in any step making up step a), namely step a1), step a2, step a3) or step a4), or in several of these steps. Preferably, at least one ε-caprolactone polymer is introduced during step a1), during step a3) or during each of these steps.

According to a first particularly preferred variant, at least one ε-caprolactone polymer is introduced during step a1) at the same time as the raw materials and at least one additive. More particularly preferably, a single ε-caprolactone polymer is introduced during step a1) at the same time as the raw materials and at least one additive.

The ε-caprolactone polymer(s), the raw materials and the additive(s) may be introduced in any order. Thus, the ε-caprolactone polymer(s) may be introduced after the water, the radical generator(s) and the dispersant(s), before the vinylidene chloride and the comonomer(s) with which it is copolymerizable and before, after or as a mixture with the additive(s). They may, in addition, be introduced after the water, before the radical generator(s), the dispersant(s) and the vinylidene chloride and the comonomer(s) with which it is copolymerizable and before, after or as a mixture with the additive(s). They may, in addition, be introduced after the radical generator(s), before the vinylidene chloride and the comonomer(s) with which it is copolymerizable, the water and the dispersant(s) and before, after or as a mixture with the additive(s). They may also be introduced after the water, the radical generator(s), the dispersant(s) and optionally at least some of the comonomer(s) copolymerizable with the vinylidene chloride and as a premix with the the additive(s), at least some of the vinylidene chloride and optionally at least some of the comonomer(s) with which it is copolymerizable; the possible balance of the vinylidene chloride then being introduced after the premix.

The ε-caprolactone polymer(s) may therefore be introduced independently or as a mixture with one or more of the additives introduced in step a1), but also as a mixture with one or more of the additives introduced in step a1) and at least some of the monomers (vinylidene chloride and the comonomer(s) with which it is polymerizable). The latter case is particularly advantageous.

According to a second particularly preferred variant, at least one ε-caprolactone polymer is added during step a3). More particularly preferably, a single ε-caprolactone polymer is added during step a3).

When they are introduced during step a3), the ε-caprolactone polymer(s) may be introduced at the beginning of the stripping phase, when this is underway, or after the stripping phase, in other words during the cooling phase.

The first particularly preferred variant is preferred to the second particularly preferred variant.

According to step a), at least one ε-caprolactone polymer is added. This may be characterized by a molecular weight less than or equal to 10 000 g/mol or by a molecular weight greater than 10 000 g/mol.

The process for preparing a vinylidene chloride polymer composition according to the invention is particularly suitable when at least one of the ε-caprolactone polymers added during step a) is characterized by a molecular weight less than or equal to 10 000 g/mol.

The process for preparing a vinylidene chloride polymer composition according to the invention is most particularly suitable when a single ε-caprolactone polymer is added during step a) and is characterized by a molecular weight less than or equal to 10 000 g/mol.

According to step b) of the process according to the invention, optionally, in addition, at least one ε-caprolactone polymer is added to the vinylidene chloride polymer recovered at the end of step a). The ε-caprolactone polymer(s) may be characterized by a molecular weight less than or equal to 10 000 g/mol or by a molecular weight greater than 10 000 g/mol.

Preferably, optionally, in addition, a single ε-caprolactone polymer is added to the vinylidene chloride polymer recovered at the end of step a). This may be characterized by a molecular weight less than or equal to 10 000 g/mol or by a molecular weight greater than this value. Preferably, this is characterized by a molecular weight greater than 10 000 g/mol.

The optional addition during step b) is carried out by mixing via premixing.

The term "premixing" is understood to mean any method that includes the use of a mixer and that makes it possible to carry out the mixing of the various components of the composition according to the invention.

A first preferred method uses a double-chamber rapid mixer. Thus, (1) all of the vinylidene chloride polymer isolated at the end of step a) and optionally some of the solid additives are advantageously introduced into a first heated and stirred chamber. (2) The liquid additive(s) and/or ε-caprolactone polymer(s), temperature-conditioned in a subsidiary reservoir, are then advantageously introduced when the temperature in the hot chamber reaches the target value. The solid additive(s) may also be introduced during this step. (3) Once the temperature is reached, the mixture is then advantageously transferred into a second cold chamber, also with stirring and which has a jacket in which low-temperature water circulates. (4) The mixture advantageously continues to be stirred to an established temperature. During this phase, one or some of the solid additives and/or ε-caprolactone polymers may also be added, preferably at the beginning of step (4). (5) Once the contents of the chamber are cooled, the chamber is emptied.

A second method advantageously uses a slow mixer of the Patterson CONAFORM® type, composed of a single jacketed chamber, into which vapour may be injected, having a slow rotation and possibly being under vacuum. The steps are quite similar to those of the first method, with introduction of the vinylidene chloride polymer isolated at the end of step a) and optionally some of the solid additives before heating the chamber, addition of the preheated liquid additive(s), when a certain temperature is reached and after homogenization at a defined temperature and for a certain time period, and finally start of the cooling phase during which it is still possible to introduce one or some solid additive(s).

The total amount of ε-caprolactone polymer(s) is advantageously between 1 and 50% by weight relative to the total weight of the composition.

The total amount of ε-caprolactone polymer(s) is advantageously at least 1, preferably at least 2, and particularly preferably at least 3% by weight relative to the total weight of the composition.

The total amount of ε-caprolactone polymer(s) is advantageously at most 50, preferably at most 30, particularly preferably at most 20, and more particularly preferably at most 15% by weight relative to the total weight of the composition.

A total amount of ε-caprolactone polymer(s) between 3 and 15% by weight relative to the total weight of the composition is most particularly preferred.

Preferably, the process according to the invention is such that step b) takes place. This is advantageously the case when the total amount of ε-caprolactone polymer(s) is very large. Some of the total amount is then preferably added during step a) and the balance during step b). Particularly preferably, at least 50% by weight of the total amount is added during step a), more particularly preferably at least 55% by weight and most particularly preferably at least 60% by weight.

Among the additives which may be added, mention may be made of heat stabilizers, colourants, UV stabilizers, mineral fillers, lubricants or processing aids, antioxidants and chlorine or oxygen scavengers commonly used.

One particularly beneficial additive is epoxidized soybean oil.

According to a first embodiment, the process according to the invention is advantageously characterized by the fact that epoxidized soybean oil is added as an additive during step a1) at the same time as the raw materials. The epoxidized soybean oil may be introduced independently or as a mixture with the ε-caprolactone polymer(s).

Preferably, according to the first embodiment, the process according to the invention is characterized by the fact that epoxidized soybean oil, in an amount of 0.1 to 7% by weight relative to the total weight of the composition, is added as an additive during step a1) at the same time as the raw materials.

According to a second embodiment, the process according to the invention is advantageously characterized by the fact that epoxidized soybean oil is added as an additive during step a3). The epoxidized soybean oil may be introduced independently or as a mixture with the ε-caprolactone polymer(s).

Preferably, according to the second embodiment, the process according to the invention is characterized by the fact that epoxidized soybean oil, in an amount of 0.1 to 7% by weight relative to the total weight of the composition, is added as an additive during step a3).

The amount of epoxidized soybean oil added according to the first and second embodiments is advantageously at least 0.1, preferably at least 0.2, particularly preferably at least 0.5, more particularly preferably at least 1 and most particularly preferably at least 1.5% by weight relative to the total weight of the composition.

The amount of epoxidized soybean oil added according to the first and second embodiments is advantageously at most 7, preferably at most 6, particularly preferably at most 5, more particularly preferably at most 4 and most particularly preferably at most 2.5% by weight relative to the total weight of the composition.

A total amount of epoxidized soybean oil between 1.5 and 2.5% by weight relative to the total weight of the composition is most particularly preferred. The first embodiment is preferred to the second.

Another subject of the present invention is a process for preparing articles which includes the use of a composition prepared by the preparation process according to the invention.

The articles may be films, foils, sheets, single-layer or multilayer films or moulded objects. Preferably, the articles are single-layer or multilayer films. These may or may not be retractable.

Another subject of the present invention is a single-layer or multilayer film which comprises a composition prepared by the preparation process according to the invention.

The single-layer or multilayer film preferably comprises a barrier layer comprising a composition prepared by the preparation process according to the invention.

The film according to the invention may be a cast film or a blow-moulded film. It may or may not be retractable.

Finally, a subject of the present invention is a packaging or bag formed from a film according to the invention.

The packaging or bag may be intended for any use. Preferably, it is intended for food packaging or medical use.

When it is intended for food packaging, it is preferably intended for packaging cheese or other foods.

When it is intended for medical use, it is preferably intended for producing ostomy pouches.

Particularly preferably, it is intended for food packaging. More particularly preferably, it is intended for cheese packaging.

The process for preparing a vinylidene chloride polymer composition according to the invention has the advantage of being simple and easy to implement and of being characterized by a high reproducibility and therefore consequently of being economically advantageous and industrially viable.

It is also advantageously characterized by the fact that it makes it possible to obtain vinylidene chloride polymer compositions that allow films to be obtained which are characterized by a carbon dioxide barrier such that the ratio of the carbon dioxide transmission rate to the oxygen transmission rate is higher than for films produced in the prior art. These compositions are also characterized by very good extrudability.

The films obtained are also advantageously characterized by the fact that the change in the oxygen and carbon dioxide barrier over time is reduced relative to the films produced in the prior art.

The following examples are intended to illustrate the invention without however limiting the scope thereof.

Determination of the Amount of ε-caprolactone Polymer(s)

The amount of ε-caprolactone polymer(s) in the composition of a vinylidene chloride polymer was determined by mass balance or by integration of the proton NMR spectrum of the composition dissolved in trichlorobenzene and using octamethylcyclotetrasiloxane as an internal standard.

Determination of the Amount of Epoxidized Soybean Oil

The amount of epoxidized soybean oil in the composition of a vinylidene chloride polymer was determined by mass balance or by thin-layer chromatography using an epoxidized soybean oil standard. The sample subjected to chromatography was obtained by dissolving the composition of a vinylidene chloride polymer in tetrahydrofuran; an operation followed by precipitation in methanol. The precipitated part was then filtered and put back into solution in tetrahydrofuran before being subjected to a second precipitation. The two soluble fractions were then brought together and concentrated using an evaporator. The concentrate obtained was subjected to thin-layer chromatography. After migration, a developing agent was used and a densitometry measurement was carried out.

Measurement of the Thermal Stability of a Vinylidene Chloride Polymer Composition The principle of the thermal stability measurement consists in processing the vinylidene chloride polymer composition in a mixing chamber so as to analyse its behaviour under stress and in concluding as to its ability to be able to be used in an extrusion machine.

The machine used for the measurement was a Brabender PL2100 Plasti-Corder machine.

In order to carry out the measurement, the hopper positioned above the mixing chamber of the machine was filled with 95 g of the sample. A pressure was exerted over the hopper using a gauge, so that the entirety of the sample was introduced into the mixing chamber. Identification of the torque (Nm) on the force scale could be carried out to stop the pressure on the gauge. The gauge and the hoppper were then removed. The introduction of the sample into the mixing chamber constituted the automatic starting point of the test and of the time countdown. The variation of the torque and the material temperature (+/−5° C. with respect to the setpoint) were monitored throughout the duration of the test.

A sample was removed in the 6th minute and every 3 minutes afterwards throughout the duration of the test and this being done until 5 to 10 minutes after the change in the slope of the torque. The material removed was then made into a ball shape and put in a press for one minute. The pellet thus obtained was then cut along the diameter ad hoc using a calibre punch and bonded to the test processing sheet. The decomposition stage was visualized either by a dark brown coloration of the pellet or by a change in the slope of the torque curve. Continuing the test for 5 to 10 minutes after the change of the slope of the torque allowed an easier and more precise determination of the decomposition point and the corresponding temperature. The thermal stability as determined is therefore the time, expressed in minutes, corresponding to the decomposition point.

Production of Films from a Vinylidene Chloride Polymer Composition

Films were prepared from the vinylidene chloride polymer compositions in question via the examples that follow.

For this, a three-layer film A/B/A (A= ethylene/vinyl acetate polymer ESCORENE® UL2020 from Exxon Mobil, B= vinylidene chloride polymer composition) was produced by coextrusion using two extruders, a feed block with four temperature zones and a 200×0.6 mm sheet die. On exiting the die, the film was cooled and drawn, to a greater or lesser extent, in the machine direction by a 3-roll calender.

For each vinylidene chloride polymer composition tested, seven films with thicknesses varying from 10 to 60 um were produced by varying the drawing rate of the film.

Half of each of these seven films were stored at below 10° C. in the fridge (hereinafter called fresh films) and the other half were treated for 2 days at 40° C. in an oven and then stored at 23° C. and 50% relative humidity (hereinafter called aged films).

Measurement of the Oxygen Transmission Rate of the Films

The principle of the method consists in determining the amount of oxygen which passes through a film of a vinylidene chloride polymer composition, per unit time and unit area, for a defined temperature and relative humidity.

For this, the film was placed in a cell so that it separates this cell into two. The first part was supplied with oxygen and the second flushed with nitrogen. The oxygen which passed through the film was transported by the nitrogen to a coulometric detector. The latter thus determined the amount of oxygen per unit time. Knowing the surface area of the cell, the amount of oxygen in cm$^3$ per day and per m$^2$ was determined.

The machine used was an OX-TRAN 1000-H HUMIDICON (Mocon) machine, conditioned at 25° C. and 85% relative humidity.

The fresh films were removed from the fridge and placed at 23° C. and 50% relative humidity for 24 h before being placed in the various measurement cells of the machine.

Measurements on the aged films stored at 23° C. and 50% relative humidity were carried out as for the fresh films.

The thickness of layer B of the film was measured before carrying out the measurement of the oxygen transmission rate.

The oxygen transmission rate was measured for the seven films with different thicknesses, produced for each vinylidene chloride polymer composition, thus giving 7 oxygen permeability measurements.

A logarithmic regression of the transmission rate as a function of the thickness was then carried out in order to calculate the transmission rate for a standard thickness of layer B of 10 μm.

The value of the oxygen transmission rate for the fresh films ($PO2_{fresh}$) and that for the aged films ($PO2_{40°,2d}$) were thus determined. The oxygen transmission rate is therefore expressed in cm$^3$/m$^2$.day.atm for a thickness of 10 μm at 25° C.

The ratio $[(PO2_{fresh}-PO2_{40°,2d})/PO2_{fresh}]\times 100$ (in %) (called delta PO2) was also determined.

Measurement of the Carbon Dioxide Permeability

The principle of the method is to determine the amount of carbon dioxide which passes through a film of a vinylidene chloride polymer composition, per unit time and unit area, for a defined temperature and relative humidity.

For this, the film is placed in a cell so that it separates this cell into two. The first part is supplied with carbon dioxide and the second is flushed with nitrogen. The carbon dioxide which passes through the film is transported by the nitrogen to the coulometric detector. The latter thus determines the amount of carbon dioxide per unit time. Knowing the surface area of the cell, the amount of carbon dioxide in cm$^3$ per day and per m$^2$ is determined.

The machine used was a Permatran C4 (Mocon) machine, conditioned at 25° C. and 50% relative humidity.

The aged films stored at 23° C. and 50% relative humidity were placed in the various measurement cells of the machine. The thickness of layer B of the film was measured before carrying out the measurement of the carbon dioxide transmission rate.

The carbon dioxide transmission rate was measured for three films with different thicknesses, produced for each vinylidene chloride polymer composition, thus giving 3 carbon dioxide permeability measurements.

A logarithmic regression of the transmission rate as a function of the thickness was then carried out in order to calculate the transmission rate for a standard thickness of layer B of 10 μm.

The value of the carbon dioxide transmission rate for the aged films ($PCO2_{40°,2d}$) was thus determined. The carbon dioxide transmission rate is therefore expressed in cm$^3$/m$^2$.day.atm for a thickness of 10 μm at 25° C.

ε-Caprolactone Polymers

The ε-caprolactone polymers used were:
the CAPA®PL1000 polymer that is in the form of a wax at room temperature (which becomes clear when it is heated slightly) and which is characterized by a linear structure, a molecular weight of 1000 g/mol, a viscosity of 150 mPa·s at 60° C. and a melting point between 30 and 40° C.;
the CAPA®3201 polymer that is in the form of a wax at room temperature and which is characterized by a (3 branch) star structure, a molecular weight of 2000 g/mol, a viscosity of 355 mPa·s at 60° C. and a melting point between 40 and 50° C.; and
the CAPA®2403 polymer that is in the form of a wax at room temperature and which is characterized by a linear structure, a molecular weight of 4000 g/mol, a viscosity of 1670 mPa·s at 60° C. and a melting point between 55 and 60° C. To facilitate its incorporation during the polymerization of the vinylidene chloride, the polymer CAPA®2403 was cryogenically ground beforehand, by first immersing it in liquid nitrogen, after having been cut into pieces of approximately 3 mm, and before then injecting it into a rotary mill (stator/rotor) to obtain a powder of which the particles are characterized by an average diameter between 100 and 700 μm (mean around 500 μm) (CAPA®2403D polymer).

EXAMPLE 1(ACCORDING TO THE INVENTION)

Introduced into a 40-liter autoclave with mechanical stirring at 160 rpm and equipped with a jacket, the temperature of which was set at 15° C., were 21 000 g of demineralized water. Introduced next were 135 g of dilauroyl peroxide and 1350 cm$^3$ of a methyl hydroxypropyl cellulose solution. The autoclave was then deaerated. 300 g of epoxidized soybean oil, DRAPEX 392previously liquified at 40° C., and 1050 g of the CAPA®PL1000 polymer were then introduced into the autoclave. Next, a mixture of vinylidene chloride (13 744.5 g) and methyl acrylate (1255.5 g) was introduced into the autoclave.

After introducing the monomers, the autoclave was heated to 72° C. The polymerization reaction was continued until the desired degree of conversion was reached, as indicated by a pressure drop in the autoclave.

Before opening the autoclave, the residual monomers were removed by stripping of the slurry formed. Thus, the stripping was carried out under vacuum (−0.8 bar) at a temperature of 75° C. for 5 h. The autoclave was then cooled and drained.

A slurry purified of the residual monomers was recovered, which was then filtered. The cake obtained was then washed by spraying with water and finally dried under a fluidized bed to obtain a vinylidene chloride polymer. The yield was 92% by weight.

Several films were then produced using the vinylidene chloride polymer composition obtained in Example 1 in the manner described previously.

The amount of epoxidized soybean oil (ESO) and the amount of ε-caprolactone polymer (PCL) in the composition, expressed in % by weight relative to the total weight of the composition and determined as explained above, are given in Tables 1 and 2. Table 1 also gives the thermal stability data measured on the composition obtained in Example 1 and determined as described previously.

Table 2 for its part gives the oxygen transmission rate $PO2_{fresh}$, the oxygen transmission rate $PO2_{40°,2d}$, the ratio $[(PO2_{fresh}-PO2_{40°,2d})/PO2_{fresh}]\times 100$ (called delta PO2), the carbon dioxide transmission rate $(PCO2_{40°,2d})$ and the ratio $PCO2_{40°,2d}/PO2_{40°,2d}$ (called ratio), measured on the films in the manner described above.

EXAMPLE 2(ACCORDING TO THE INVENTION)

Introduced into a 40-liter autoclave with mechanical stirring at 160 rpm and equipped with a jacket, the temperature of which was set at 15° C., were 21 000 g of demineralized water. Introduced next were 135 g of dilauroyl peroxide and 1350 cm³ of a methyl hydroxypropyl cellulose solution. 2100 g of the ε-caprolactone polymer CAPA®PL1000 were then introduced into the autoclave. The autoclave was then deaerated. 300 g of epoxidized soybean oil, DRAPEX 392 previously liquified at 40° C., were then introduced into the autoclave. Next, a mixture of vinylidene chloride (13 744.5 g) and methyl acrylate (1255.5 g) was introduced into the autoclave.

After introducing the monomers, the autoclave was heated to 72° C. The polymerization reaction was continued until the desired degree of conversion was reached, as indicated by a pressure drop in the autoclave.

Before opening the autoclave, the residual monomers were removed by stripping of the slurry formed. Thus, the stripping was carried out under vacuum (−0.8 bar) at a temperature of 75° C. for 5 h. The autoclave was then cooled and drained.

A slurry purified of the residual monomers was recovered, which was then filtered. The cake obtained was then washed by spraying with water and finally dried under a fluidized bed to obtain a vinylidene chloride polymer. The yield was 89% by weight.

Several films were then produced using the vinylidene chloride polymer composition obtained in Example 2 in the manner described previously.

The amount of epoxidized soybean oil (ESO) and the amount of ε-caprolactone polymer (PCL) in the composition, expressed in % by weight relative to the total weight of the composition and determined as explained above, are given in Tables 1 and 2. Table 1 also gives the thermal stability data measured on the composition obtained in Example 2 and determined as described previously.

Table 2 for its part gives the oxygen transmission rate $PO2_{fresh}$, the oxygen transmission rate $PO2_{40°,2d}$, the ratio $[(PO2_{fresh}-PO2_{40°,2d})/PO2_{fresh}]\times 100$ (called delta PO2), the carbon dioxide transmission rate $(PCO2_{40°,2d})$ and the ratio $PCO2_{40°,2d}/PO2_{40°,2d}$ (called ratio), measured on the films in the manner described above.

EXAMPLE 3(ACCORDING TO THE INVENTION)

Introduced into a 40-liter autoclave with mechanical stirring at 240 rpm and equipped with a jacket, the temperature of which was set at 15° C., were 21 000 g of demineralized water. Introduced next into the autoclave was a mixture, produced beforehand and kept at 60° C., of 2100 g of the CAPA®3201polymer and 300 g of epoxidized soybean oil DRAPEX 390. Introduced next were 135 g of dilauroyl peroxide and 1350 cm3 of a methyl hydroxypropyl cellulose solution. The autoclave was then deaerated. Next, a mixture of vinylidene chloride (13 744.5 g) and methyl acrylate (1255.5 g) was introduced into the autoclave.

After introducing the monomers, the autoclave was heated to 72° C. The polymerization reaction was continued until the desired degree of conversion was reached, as indicated by a pressure drop in the autoclave.

Before opening the autoclave, the residual monomers were removed by stripping of the slurry formed. Thus, the stripping was carried out under vacuum (−0.8 bar) at a temperature of 75° C. for 5 h. The autoclave was then cooled and drained.

A slurry purified of the residual monomers was recovered, which was then filtered. The cake obtained was then washed by spraying with water and finally dried under a fluidized bed to obtain a vinylidene chloride polymer. The yield was 81% by weight.

EXAMPLE 4(ACCORDING TO THE INVENTION)

Introduced into a 40-liter autoclave with mechanical stirring at 160 rpm and equipped with a jacket, the temperature of which was set at 15° C., were 135 g of dilauroyl peroxide and then 300 g of epoxidized soybean oil, DRAPEX 392 previously liquified at 40° C., and 1050 g of the CAPA®PL1000 polymer. The autoclave was then deaerated. 1255.5 g of methyl acrylate were then introduced into the autoclave, followed by 13 744.5 g of vinylidene chloride. 10 500 g of demineralized water were then introduced before 1350 cm³ of a methyl hydroxypropyl cellulose solution and finally 10 500 g of demineralized water.

After that, the autoclave was heated to 72° C. The polymerization reaction was continued until the desired degree of conversion was reached, as indicated by a pressure drop in the autoclave.

Before opening the autoclave, the residual monomers were removed by stripping of the slurry formed. Thus, the stripping was carried out under vacuum (−0.8 bar) at a temperature of 75° C. for 5 h. The autoclave was then cooled and drained.

A slurry purified of the residual monomers was recovered, which was then filtered. The cake obtained was then washed by spraying with water and finally dried under a fluidized bed to obtain a vinylidene chloride polymer. The yield was 92% by weight.

The amount of epoxidized soybean oil (ESO) and the amount of ε-caprolactone polymer (PCL) in the composition, expressed in % by weight relative to the total weight of the composition and determined as explained above, are given in Table 1. Table 1 also gives the thermal stability data measured on the composition obtained in Example 4 and determined as described previously.

EXAMPLE 5 (ACCORDING TO THE INVENTION)

Introduced into a 176-liter autoclave with mechanical stirring at 110 rpm and equipped with a jacket, the temperature of which was set at 15° C., were 91 000 g of demineralized water. Introduced next were 650 g of dilauroyl peroxide and 5850 cm³ of a methyl hydroxypropyl cellulose solution. 9100 g of the ε-caprolactone polymer CAPA®PL1000 were then introduced into the autoclave. The autoclave was then deaerated. 1300 g of epoxidized soybean oil, DRAPEX 392 previously liquified at 40° C., were then introduced into the autoclave. 5440.5 g of methyl acrylate were then introduced into the autoclave, followed by 59 559.5 g of vinylidene chloride.

After introducing the monomers, the autoclave was heated to 72° C. The polymerization reaction was continued until the desired degree of conversion was reached, as indicated by a pressure drop in the autoclave.

Before opening the autoclave, the residual monomers were removed by stripping of the slurry formed. Thus, the stripping was carried out under vacuum (−0.8 bar) at a temperature of 75° C. for 5 h. The autoclave was then cooled and drained.

A slurry purified of the residual monomers was recovered, which was then filtered. The cake obtained was then washed by spraying with water and finally dried under a fluidized bed to obtain a vinylidene chloride polymer.

EXAMPLE 6 (ACCORDING TO THE INVENTION)

Example 1 was reproduced but introducing 1050 g of the CAPA®PL1000 polymer, not with the raw materials but during the cooling phase which followed the stripping. The temperature was then around 70° C. The slurry purified of the residual monomers was then recovered and treated as described in Example 1.

Several films were then produced using the vinylidene chloride polymer composition obtained in Example 6 in the manner described previously.

The amount of epoxidized soybean oil (ESO) and the amount of ε-caprolactone polymer (PCL) in the composition, expressed in % by weight relative to the total weight of the composition and determined as explained above, are given in Tables 1 and 2. Table 1 also gives the thermal stability data measured on the composition obtained in Example 6 and determined as described previously.

Table 2 for its part gives the oxygen transmission rate $PO2_{fresh}$, the oxygen transmission rate $PO2_{40°,2d}$, the ratio $[(PO2_{fresh}-PO2_{40°,2d})/PO2_{fresh}]\times 100$ (called delta PO2), the carbon dioxide transmission rate ($PCO2_{40°,2d}$) and the ratio $PCO2_{40°,2d}/PO2_{40°,2d}$ (called ratio), measured on the films in the manner described above.

EXAMPLE 7 (COMPARATIVE)

By way of comparison, Example 1 was reproduced without introducing the ε-caprolactone polymer.

Several films were then produced using the vinylidene chloride polymer composition obtained in Example 7 in the manner described previously.

The amount of epoxidized soybean oil (ESO) in the composition, expressed in % by weight relative to the total weight of the composition and determined as explained above, is given in Tables 1 and 2. Table 1 also gives the thermal stability data measured on the composition obtained in Example 7 and determined as described previously.

Table 2 for its part gives the oxygen transmission rate $PO2_{fresh}$, the oxygen transmission rate $PO2_{40°,2d}$, the ratio $[(PO2_{fresh}-PO2_{40°,2d})/PO2_{fresh}]\times 100$ (called delta PO2), the carbon dioxide transmission rate ($PCO2_{40°,2d}$) and the ratio $PCO2_{40°,2d}/PO2_{40°,2d}$ (called ratio), measured on the films in the manner described above.

EXAMPLE 8 (COMPARATIVE)

The vinylidene chloride polymer composition obtained in Example 7 was additivated with an amount of epoxidized soybean oil such that the total amount of it was 8% by weight relative to the total weight of the composition. The additivation was carried out by premixing.

For that, the composition obtained in Example 7 was placed in a chamber at room temperature, stirred at 600 rpm. The temperature of the chamber was then raised to 35° C. When the temperature of 35° C. was reached, the epoxidized soybean oil, preheated to 55° C., was introduced into the chamber. The temperature was then raised to 70° C. When this temperature was reached, the contents of the chamber were discharged to another chamber stirred at 170 rpm and equipped with a jacket in which water circulated allowing the contents of the chamber to be cooled. The temperature of the composition was thus therefore lowered until it was below 30° C. The composition obtained was then recovered.

Several films were then produced using the vinylidene chloride polymer composition obtained in Example 8 in the manner described previously.

The amount of epoxidized soybean oil (ESO) in the composition, expressed in % by weight relative to the total weight of the composition and determined as explained above, is given in Tables 1 and 2. Table 1 also gives the thermal stability data measured on the composition obtained in Example 8 and determined as described previously.

Table 2 for its part gives the oxygen transmission rate $PO2_{fresh}$, the oxygen transmission rate $PO2_{40°,2d}$, the ratio $[(PO2_{fresh}-PO2_{40°,2d})/PO2_{fresh}]\times 100$ (called delta PO2), measured on the films in the manner described above.

EXAMPLE 9 (ACCORDING TO THE INVENTION)

Introduced into a carboy were 8400 g of vinylidene chloride, 1171.8 g of methyl acrylate, 280 g of epoxidized soybean oil DRAPEX 392 and 1078 g of the CAPA®2403D polymer. The premix was then stirred and left at room temperature for around 1 h 30 min to allow the epoxidized soybean oil and CAPA®2403D polymer to completely dissolve, which was achieved when particles could no longer be seen in dispersion in the mixture, being characterized then by a clear appearance.

Introduced into a 40-litre autoclave with mechanical stirring at 160 rpm and equipped with a jacket, the temperature of which was set at 15° C., were 21 280 g of demineralized water. Introduced next were 140 g of dilauroyl peroxide and 1820 cm³ of a methyl hydroxypropyl cellulose solution. The autoclave was then deaerated. The vinylidene chloride/methyl acrylate/epoxidized soybean oil/CAPA®2403D polymer premix was then introduced into the autoclave, followed by 4428.2 g of vinylidene chloride.

After introducing the monomers, the autoclave was heated to 72° C. The polymerization reaction was continued until the desired degree of conversion was reached, as indicated by a pressure drop in the autoclave.

Before opening the autoclave, the residual monomers were removed by stripping of the slurry formed. Thus, the stripping was carried out under vacuum (−0.8 bar) at a temperature of 75° C. for 5 h. The autoclave was then cooled and drained.

A slurry purified of the residual monomers was recovered, which was then filtered. The cake obtained was then washed by spraying with water and finally dried under a fluidized bed to obtain a vinylidene chloride polymer. The yield was 94% by weight.

Several films were then produced using the vinylidene chloride polymer composition obtained in Example 9 in the manner described previously.

The amount of epoxidized soybean oil (ESO) and the amount of ε-caprolactone polymer (PCL) in the composition, expressed in % by weight relative to the total weight of the composition and determined as explained above, are given in Tables 1 and 2. Table 1 also gives the thermal stability data measured on the composition obtained in Example 9 and determined as described previously.

Table 2 for its part gives the oxygen transmission rate $PO2_{fresh}$, the oxygen transmission rate $PO2_{40°, 2d}$ and the ratio $[(PO2_{fresh} - PO2_{40°, 2d})/PO2_{fresh}] \times 100$ (called delta PO2), measured on the films in the manner described above.

EXAMPLE 10 (ACCORDING TO THE INVENTION)

Introduced into a carboy were 9600 g of vinylidene chloride, 320 g of epoxidized soybean oil DRAPEX 392 and 1232 g of the CAPA®2403D polymer. The premix was then stirred and left at room temperature for around 1 h 30 min to allow the epoxidized soybean oil and CAPA®2403D polymer to completely dissolve, which was achieved when particles could no longer be seen in dispersion in the mixture, characterized then by a clear appearance.

Introduced into a 40-litre autoclave with mechanical stirring at 160 rpm and equipped with a jacket, the temperature of which was set at 15° C., were 21 760 g of demineralized water. Introduced next were 160 g of dilauroyl peroxide and 2080 cm³ of a methyl hydroxypropyl cellulose solution. The autoclave was then deaerated. 1339 g of methyl acrylate were then introduced into the autoclave, followed by the vinylidene chloride/epoxidized soybean oil/CAPA®2403D polymer premix and finally 5061 g of vinylidene chloride.

After introducing the monomers, the autoclave was heated to 72° C. The polymerization reaction was continued until the desired degree of conversion was reached, as indicated by a pressure drop in the autoclave.

Before opening the autoclave, the residual monomers were removed by stripping of the slurry formed. Thus, the stripping was carried out under vacuum (−0.8 bar) at a temperature of 75° C. for 5 h. The autoclave was then cooled and drained.

A slurry purified of the residual monomers was recovered, which was then filtered. The cake obtained was then washed by spraying with water and finally dried under a fluidized bed to obtain a vinylidene chloride polymer. The yield was 99.7% by weight.

Several films were then produced using the vinylidene chloride polymer composition obtained in Example 10 in the manner described previously.

The amount of epoxidized soybean oil (ESO) and the amount of ε-caprolactone polymer (PCL) in the composition, expressed in % by weight relative to the total weight of the composition and determined as explained above, are given in Tables 1 and 2. Table 1 also gives the thermal stability data measured on the composition obtained in Example 10 and determined as described previously.

Table 2 for its part gives the oxygen transmission rate $PO2_{fresh}$, the oxygen transmission rate $PO2_{40°, 2d}$ and the ratio $[(PO2_{fresh} - PO2_{40°, 2d})/PO2_{fresh}] \times 100$ (called delta PO2), measured on the films in the manner described above.

TABLE 1

|   | ESO | PCL | Thermal stability |
|---|---|---|---|
| 1 | 1.8 | 7.6 | 16 |
| 2 | 1.7 | 13.9 | 13 |
| 4 | 1.8 | 6.5 | 19 |
| 6 | 1.8 | 8.9 | 12 |
| 7 (comparative) | 2 | 0 | 12 |
| 8 (comparative) | 8 | 0 | 15 |
| 9 | 1.8 | 8.4 | 15 |
| 10 | 1.8 | 7 | 15 |

TABLE 2

|   | ESO | PCL | $PO2_{fresh}$ | $PO2_{40°, 2d}$ | delta PO2 | $PCO2_{40°, 2d}$ | Ratio |
|---|---|---|---|---|---|---|---|
| 1 | 1.8 | 7.6 | 83 | 75 | 10 | 316 | 4.2 |
| 2 | 1.7 | 13.9 | 350 | 318 | 9 | 2065 | 6.5 |
| 6 | 1.9 | 8.9 | 134 | 111 | 17 | 489 | 4.4 |
| 7 | 2 | 0 | 16 | 11 | 31 | 30 | 2.7 |
| 8 | 8 | 0 | 78 | 55 | 29 | nd | nd |
| 9 | 1.8 | 8.4 | 102 | 82 | 20 | nd | nd |
| 10 | 1.8 | 7 | 113 | 94 | 17 | nd | nd | nd: not determined

It can therefore be observed that the films obtained according to the examples according to the invention are characterized by a delta PO2 below 25% whereas the films obtained according to the comparative examples are characterized by a delta PO2 above this value. They are therefore characterized by a better stability of the oxygen barrier over time than the films obtained according to the comparative examples from a composition that did not contain any ε-caprolactone polymer. Moreover, they are characterized by a higher $PCO2_{40°, 2d}/PO2_{40°, 2d}$ ratio than the films obtained according to comparative Example 7, thus reflecting an increased PCO2/PO2 selectivity.

The invention claimed is:

1. A process for preparing a composition comprising a vinylidene chloride polymer and at least one separate ε-caprolactone polymer, comprising:
   a) preparing the vinylidene chloride polymer by polymerization of vinylidene chloride and at least one comonomer that is copolymerizable with vinylidene chloride in a vinylidene chloride polymerization medium,
   wherein:
   during the polymerization of the vinylidene chloride and the at least one comonomer that is copolymerizable with vinylidene chloride, at least one ε-caprolactone polymer prepared prior to and independently of the vinylidene chloride polymer in another polymerization medium from which it was isolated is added into the vinylidene chloride polymerization medium,
   said polymerization of the vinylidene chloride and the at least one comonomer that is copolymerizable with vinylidene chloride provides said vinylidene chloride polymer,
   said process provides said composition comprising said vinylidene chloride polymer and said at least one separate ε-caprolactone polymer, and
   the vinylidene chloride polymer is a copolymer consisting of vinylidene chloride in an amount of at least 50 wt % and at least one comonomer chosen from (meth)acrylic monomers corresponding to the general formula :

$$CH_2=CR_1R_2$$

in which $R_1$ is chosen from hydrogen and the methyl radical; and $R_2$ is the —CO—$R_3$ radical in which $R_3$ is chosen from the —OH radical and —O—$R_4$ radicals, with $R_4$ chosen from linear or branched alkyl radicals containing from 1 to 18 carbon atoms optionally bearing one or more —OH radicals, epoxyalkyl radicals containing from 2 to 10 carbon atoms, and alkoxyalkyl radicals containing a total of 2 to 10 carbon atoms.

2. The process according to claim 1, wherein the polymerization of the vinylidene chloride and at least one comonomer that is copolymerizable with vinylidene chloride is carried out by a radical route in aqueous suspension.

3. The process according to claim 1, wherein the polymerization of the vinylidene chloride and at least one comonomer that is copolymerizable with vinylidene chloride, besides the addition of the at least one ε-caprolactone polymer, comprises:
  a1) introducing at least one fraction of the raw materials needed for the polymerization and also, optionally, at least one additive, into a reactor;
  a2) reacting the contents of the reactor while optionally introducing the balance of said raw materials, with optional addition of at least one additive, whereby after reaction, a slurry containing residual monomers is obtained;
  a3) removing the residual monomers from the slurry obtained in a2), with optional addition of at least one additive, whereby a slurry purified of the residual monomers is obtained; and
  a4) isolating the vinylidene chloride polymer from the slurry obtained in a3).

4. The process according to claim 3, wherein the at least one ε-caprolactone polymer is introduced during a1), during a3) or during both a1) and a3).

5. The process according to claim 3, wherein the at least one ε-caprolactone polymer is introduced during a1) at the same time as the raw materials and optional at least one additive.

6. The process according to claim 3, wherein the at least one ε-caprolactone polymer is added during a3).

7. The process according to claim 3, wherein epoxidized soybean oil, in an amount of 0.1 to 7% by weight relative to the total weight of vinylidene chloride polymer and ε-caprolactone polymer(s), is added as an additive during a1) at the same time as the raw materials.

8. The process according to claim 3, wherein epoxidized soybean oil, in an amount of 0.1 to 7% by weight relative to the total weight of vinylidene chloride polymer and ε-caprolactone polymer(s), is added as an additive during a3).

9. The process according to claim 1, further comprising:
  b) isolating a composition comprising a vinylidene chloride polymer and at least one ε-caprolactone polymer at the end of a) and, thereafter, further adding at least one ε-caprolactone polymer to the composition by mixing via premixing.

10. The process according to claim 9, wherein the total amount of ε-caprolactone polymer(s) is between 1 and 50% by weight relative to the total weight of vinylidene chloride polymer and ε-caprolactone polymer(s).

11. The process according to claim 1, wherein the total amount of ε-caprolactone polymer(s) is between 1 and 50% by weight relative to the total weight of vinylidene chloride polymer and ε-caprolactone polymer(s).

12. The process according to claim 1, wherein the vinylidene chloride polymer is a copolymer consisting of vinylidene chloride in an amount of at least 50 wt % and at least one comonomer chosen from (meth)acrylic monomers corresponding to the general formula :

$$CH_2=CR_1R_2$$

in which $R_1$ is chosen from hydrogen and the methyl radical; and $R_2$ is the —CO—$R_3$ radical in which $R_3$ is chosen from the —OH radical and —O—$R_4$ radicals, with $R_4$ chosen from epoxyalkyl radicals containing from 2 to 10 carbon atoms, and alkoxyalkyl radicals containing a total of 2 to 10 carbon atoms.

13. The process according to claim 1, wherein the vinylidene chloride polymer is a copolymer consisting of vinylidene chloride in an amount of at least 50 wt % and at least one comonomer chosen from (meth)acrylic monomers corresponding to the general formula :

$$CH_2=CR_1R_2$$

in which $R_1$ is chosen from hydrogen and the methyl radical; and $R_2$ is the —CO—$R_3$ radical in which $R_3$ is chosen from —O—$R_4$ radicals, with $R_4$ chosen from linear or branched alkyl radicals containing from 1 to 18 carbon atoms optionally bearing one or more —OH radicals.

14. The process according to claim 13, wherein the vinylidene chloride polymer is a copolymer consisting of vinylidene chloride in an amount of at least 50 wt % and methyl acrylate.

15. The process according to claim 1, further comprising:
  b) isolating a composition comprising a vinylidene chloride polymer and at least one ε-caprolactone polymer at the end of a) and, thereafter, further adding at least one ε-caprolactone polymer to the composition.

* * * * *